(12) United States Patent
Meola et al.

(10) Patent No.: US 11,384,865 B2
(45) Date of Patent: Jul. 12, 2022

(54) TUBE MANAGEMENT ASSEMBLY (71) Applicant: BioFlex Solutions, LLC, Hackettstown, NJ (US)

(72) Inventors: Ralph M. Meola, Hackettstown, NJ (US); Jennifer A. Taliercio, Newton, NJ (US)

(73) Assignee: BIOFLEX SOLUTIONS, LLC, Hackettstown, NJ (US)

( * ) Notice: Subject to any disclaimer, the term of this patent is extended or adjusted under 35 U.S.C. 154(b) by 534 days.

(21) Appl. No.: 15/703,625

(22) Filed: Sep. 13, 2017

(65) Prior Publication Data

US 2018/0238473 A1   Aug. 23, 2018

Related U.S. Application Data (60) Provisional application No. 62/461,475, filed on Feb. 21, 2017.

(51) Int. Cl.

| | |
|---|---|
| *F16L 3/01* | (2006.01) |
| *F16B 2/06* | (2006.01) |
| *F16L 3/22* | (2006.01) |
| *F16L 3/10* | (2006.01) |
| *F16B 2/10* | (2006.01) |
| *F16L 3/24* | (2006.01) |
| *F16B 21/08* | (2006.01) |
| *F16B 2/12* | (2006.01) |

(52) U.S. Cl.
CPC ........ *F16L 3/01* (2013.01); *F16B 2/06* (2013.01); *F16B 2/10* (2013.01); *F16L 3/1075* (2013.01); *F16L 3/221* (2013.01); *F16L 3/243* (2019.08); *F16B 2/12* (2013.01); *F16B 21/088* (2013.01)

(58) Field of Classification Search
CPC ..... F16L 3/01; F16L 3/221; F16L 3/22; F16L 3/223; F16L 3/1075; F16L 3/1083; F16L 3/1041; F16L 3/105; F16L 3/10; F16L 3/1008; F16L 3/12; F16L 3/1207; F16L 3/1222; F16L 3/123; F16L 3/127; F16L 3/2235; F16L 3/227; F16L 3/24; F16B 2/06; F16B 2/10
USPC .............................. 248/229.1, 73, 74.1, 74.3
See application file for complete search history.

(56) References Cited

U.S. PATENT DOCUMENTS

| | | | |
|---|---|---|---|
| 3,637,177 A * | 1/1972 | Santucci ................... | F16L 3/08 248/74.3 |
| 6,105,216 A * | 8/2000 | Opperthauser ......... | F16L 3/243 24/459 |
| 2002/0063190 A1* | 5/2002 | Buck ........................ | H02G 3/32 248/74.1 |
| 2009/0294600 A1* | 12/2009 | Dodge .................... | F16L 3/243 248/73 |

(Continued)

*Primary Examiner* — Christopher Garft
(74) *Attorney, Agent, or Firm* — Francis C. Hand; Carella, Byrne, et al (57) ABSTRACT

The tube management assembly employs a track, one or more mounting clips that are slidably mounted in the track and clamps that are snap-fitted into the mounting clips. In one embodiment, the mounting clip has a pair of resilient walls with inwardly directed lips for engaging in arcuate grooves in the sides of the clamp. In another embodiment, the mounting clip has a base slidably mounted in the track and a mounting block extending from the base and including a recess for receiving a tube transversely of the track.

17 Claims, 13 Drawing Sheets

(56) References Cited

U.S. PATENT DOCUMENTS

| | | | | |
|---|---|---|---|---|
| 2011/0303456 A1* | 12/2011 | Blanchard | ............... | F16L 3/222 |
| | | | | 174/480 |
| 2013/0047385 A1* | 2/2013 | Healy | .................... | B64C 1/406 |
| | | | | 24/572.1 |
| 2014/0076420 A1* | 3/2014 | Westermann | ........... | E04G 21/04 |
| | | | | 137/351 |
| 2014/0097304 A1* | 4/2014 | Mastro | .................... | F16L 3/243 |
| | | | | 248/73 |
| 2018/0031149 A1* | 2/2018 | Van Der Mik | ....... | F16L 3/1075 |

* cited by examiner

TUBE MANAGEMENT ASSEMBLY

This is a Non-Provisional patent application and claims the benefit of Provisional Patent Application 62/461,475, filed Feb. 21, 2017.

This invention relates to a tube management assembly. More particularly, this invention relates to a tube management assembly Including at least one tube management clamp and a mounting clip for the clamp. More particularly, this invention relates to a tube management assembly for use in the high purity drug and pharmaceutical and related industries.

BACKGROUND

Drug manufacturers are utilizing single use systems to manufacture liquid drug products. These systems are typically constructed of temporary tubing flow paths and plastic components. They are installed prior to processing and then disposed of after a process is complete. These temporary systems create a challenge of organizing and effectively managing the tubing and fluid paths that are created in a drug production work area.

It is an object of the present invention to mechanically secure single use fittings and tubing in place for single use systems to manufacture liquid drug products.

It is another object of the invention to provide a mounting clip for a clamp that provides a secure locking arrangement for the clamp.

It is another object of the invention to provide a tube management assembly that can be easily assembled to control a fluid path in a drug production area and disassembled after use.

Briefly, the invention provides a tube management assembly that employs a track that can be mounted on a horizontal surface or vertical surface, at least one mounting clip that is slidably mounted in the track and a clamp releasably mounted in the clip for holding the components of a tubing flow path assembly in place.

The tube management assembly may also employ at least one mounting block that is slidably mounted in the track and that includes a recess for receiving a tube of a tubing flow path assembly transversely of the track.

The track is constructed with a flat base, a pair of parallel walls extending from the base and a pair of flanges extending from the walls towards each other to define a trackway. The track may be of any determinative length to accommodate several mounting blocks for establishing a tubing flow path assembly and may be provided with pre-formed holes for passage of screws or the like into a support surface.

The mounting clip is made of plastic and is constructed to hold a secondary plastic or elastomer device, such as the clamp, which is used for fluid transfer, by means of a mating geometry and mechanical forces.

In one embodiment, the mounting clip has a flat base that is slidably mounted in the trackway of the track, a mounting block on the base, a pair of resiliently flexible walls extending in parallel on opposite sides of the mounting block from the base and a pair of lips, each of which extends from a respective wall towards the other wall for engaging and securing the clamp in the clip.

The clamp is made of plastic and has a pair of arcuate jaws for receiving a tube in clamped relation. In addition, at least one of the jaws is seated on the mounting block and has an arcuate groove on each side receiving a respective lip of the mounting clip.

The clamp may be formed of a pair of jaws that are disposed in hinged relation to each other for opening and closing relative to each other or may be formed of a pair of semi-circular jaws that can be snap-fitted together to receive a tube.

In accordance with the invention, the mounting clip is constructed to allow a user to easily secure the clamp with complementary geometry into place by means of pressing the two parts together. A gradual geometry on the clip will guide the clamp onto a receiving portion area on the clip, and then secure the two parts together for the purpose of keeping the assembly in a designated location.

Mounting of the mounting clip in a slidable manner in the track allows several mounting clips to be employed at variable locations in the track to accommodate different lengths of tubular modular elements of a tubing flow path assembly.

These and other objects of the invention will become more apparent taken in conjunction with the accompanying drawings wherein:

Referring to FIG. 1, the mounting clip 10 is of one piece construction and is made of a suitable plastic;

Figure 1:
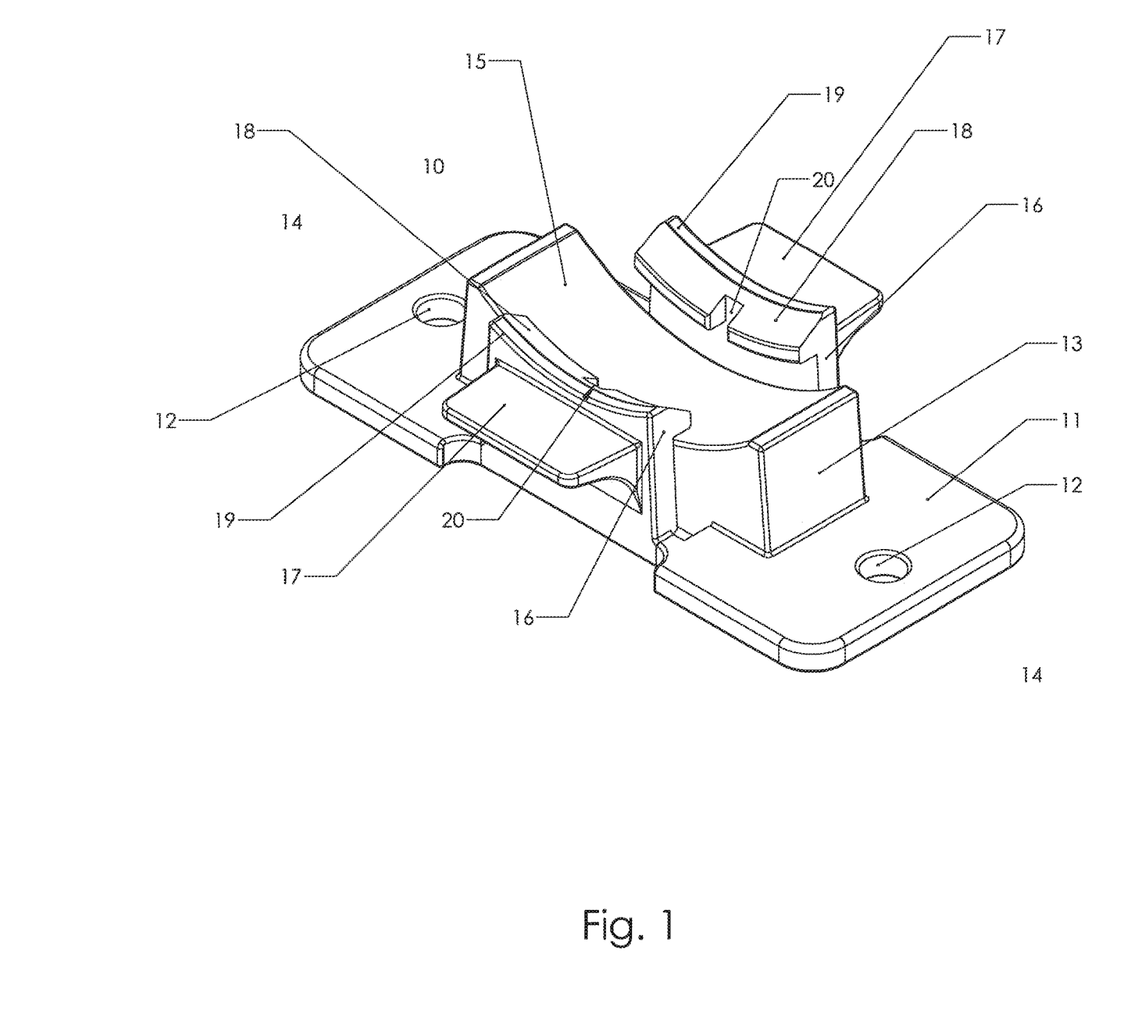
FIG. 1 illustrates a perspective view of a mounting clip in accordance with the invention.

Referring to FIG. 1, the mounting clip 10 of the tube management assembly has a flat base 11 of rectangular shape with an aperture 12 at each of two ends for receiving a mounting element, for example, a screw (not shown) to secure the clip 10 to a mounting surface.

In addition, the mounting clip 10 has a mounting block 13 centrally located on a longitudinal axis 14 of the clip 10 and between the two ends of the base 11.

Figure 3:
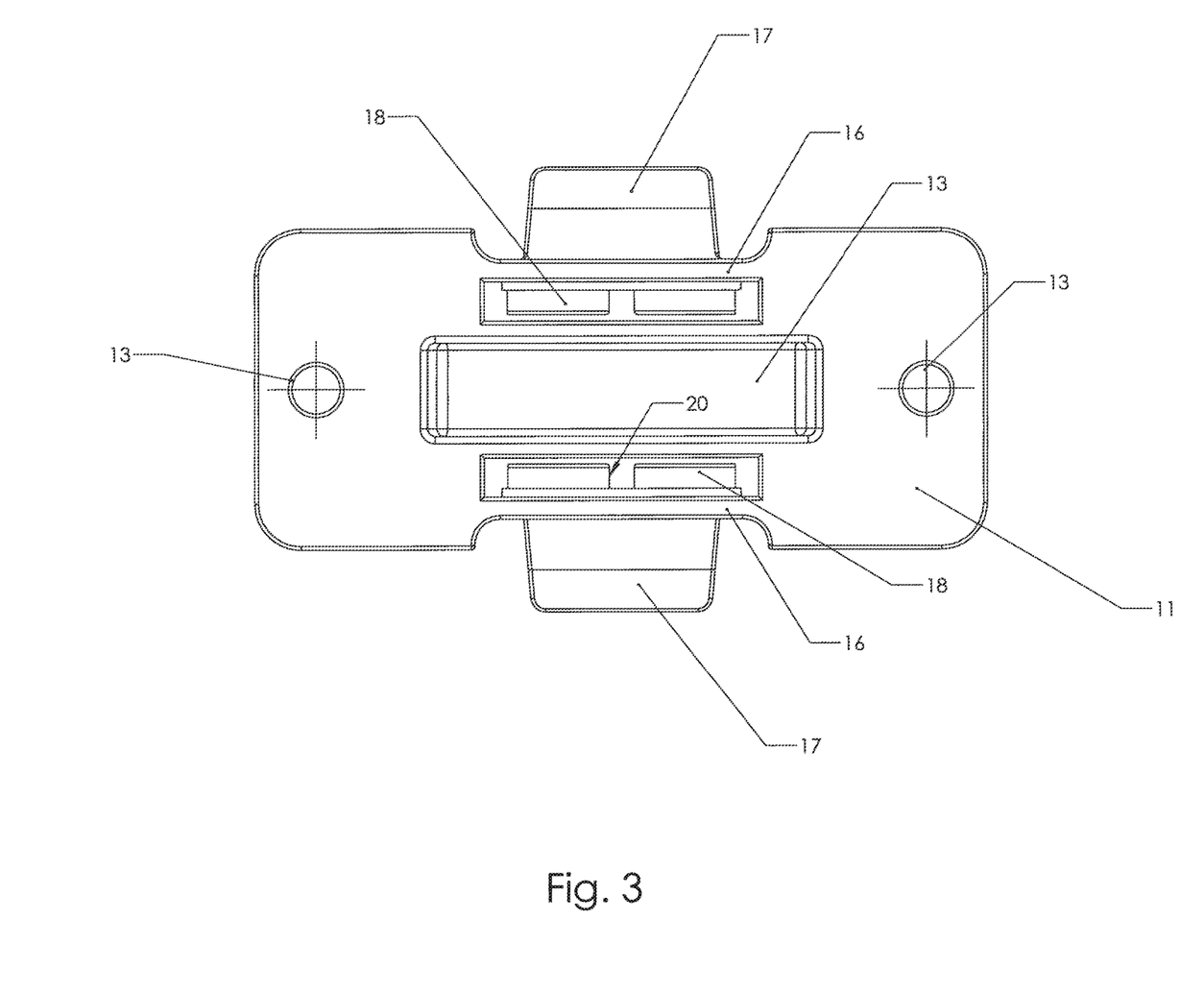
FIG. 3 illustrates a bottom view of the clip of FIG. 1.
Figure 4:
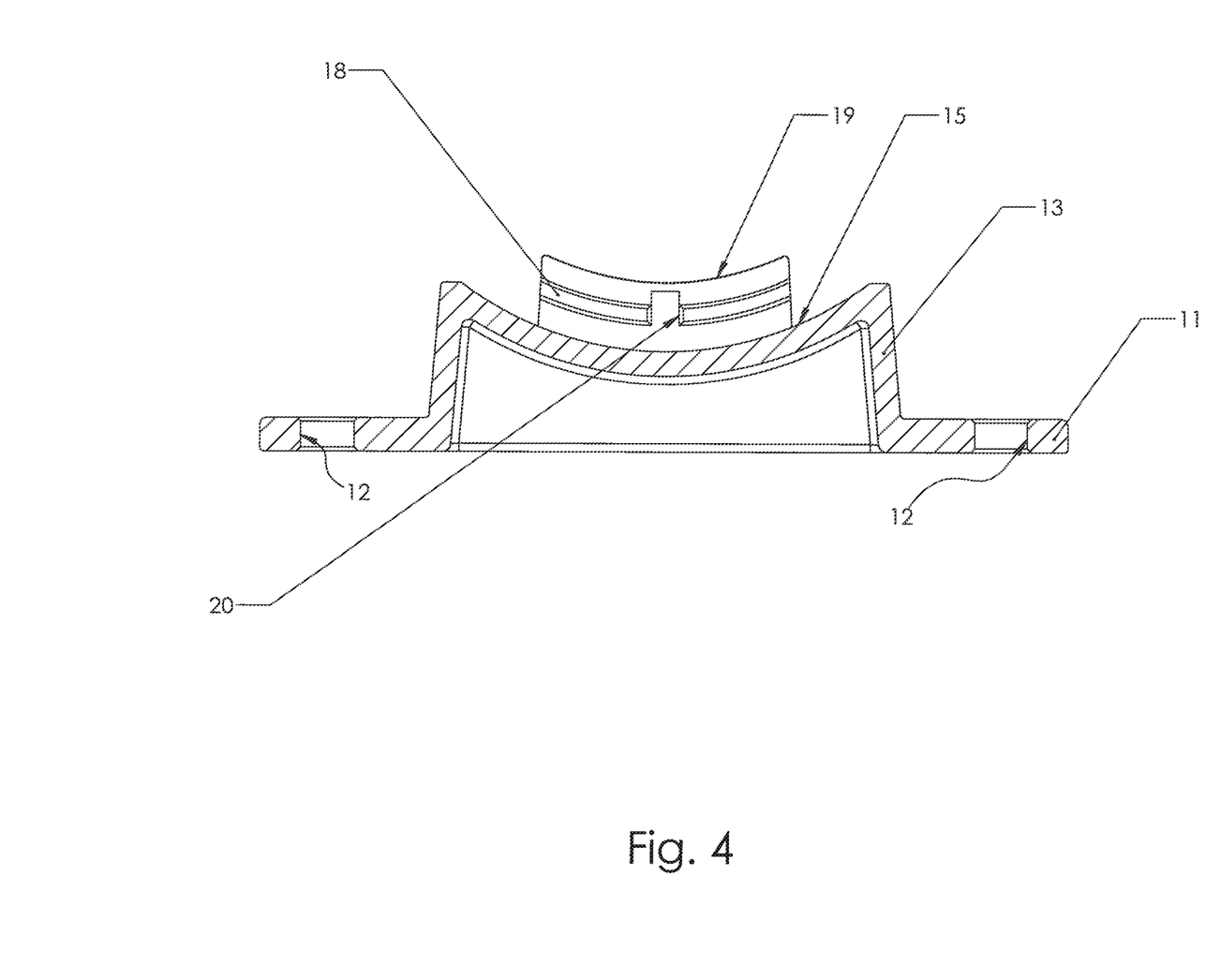
FIG. 4 illustrates a cross-sectional view of the clip of FIG. 1 taken on line 4-4 of FIG. 2.

As illustrated in FIGS. 1, 3 and 4, the mounting block 13 is of hollow construction and is raised from the base 11 with an arcuate upper seating surface 15 extending longitudinally of the block 13.

Figure 2:
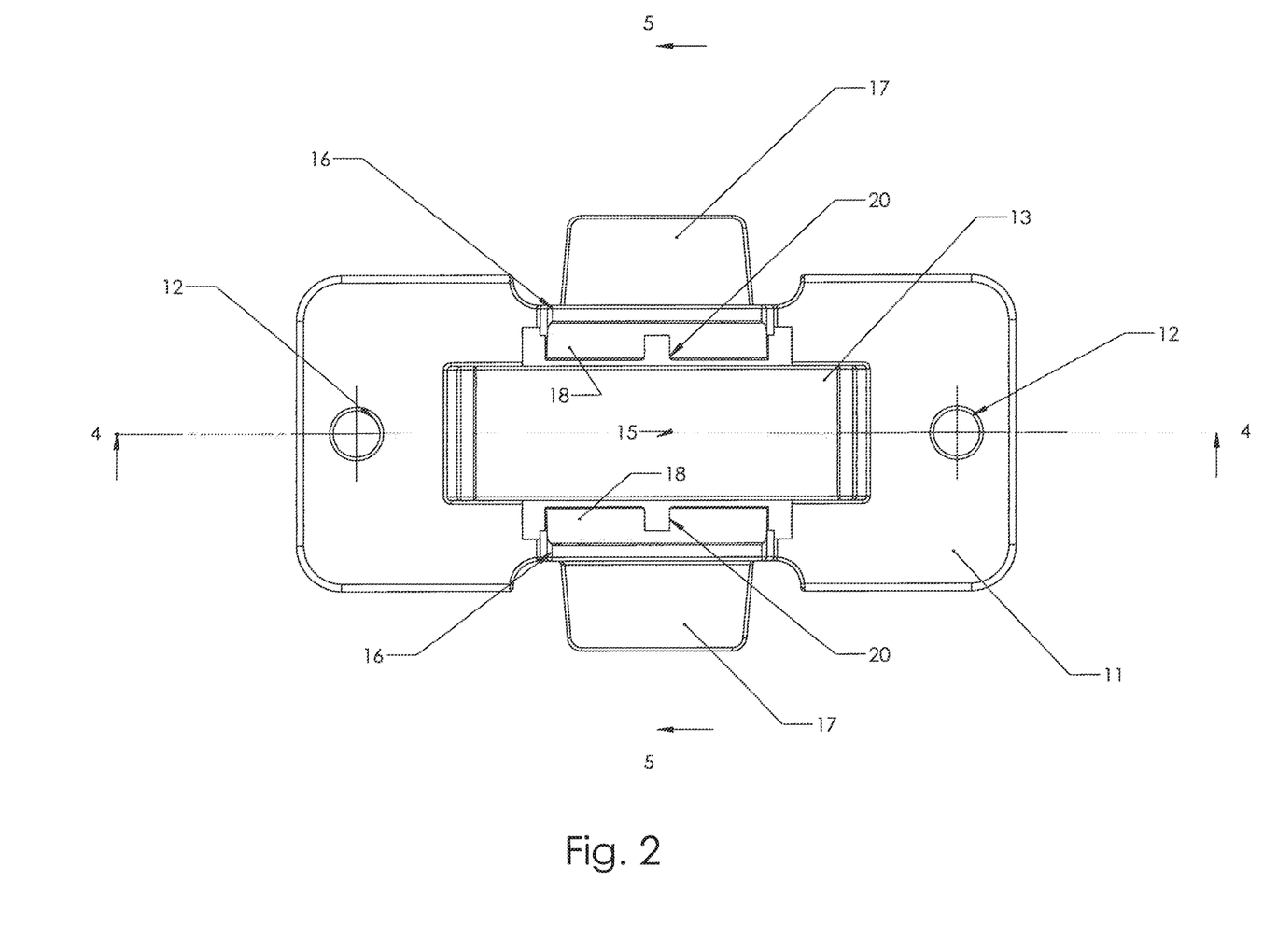
FIG. 2 illustrates a top view of the clip of FIG. 1.
Figure 5:
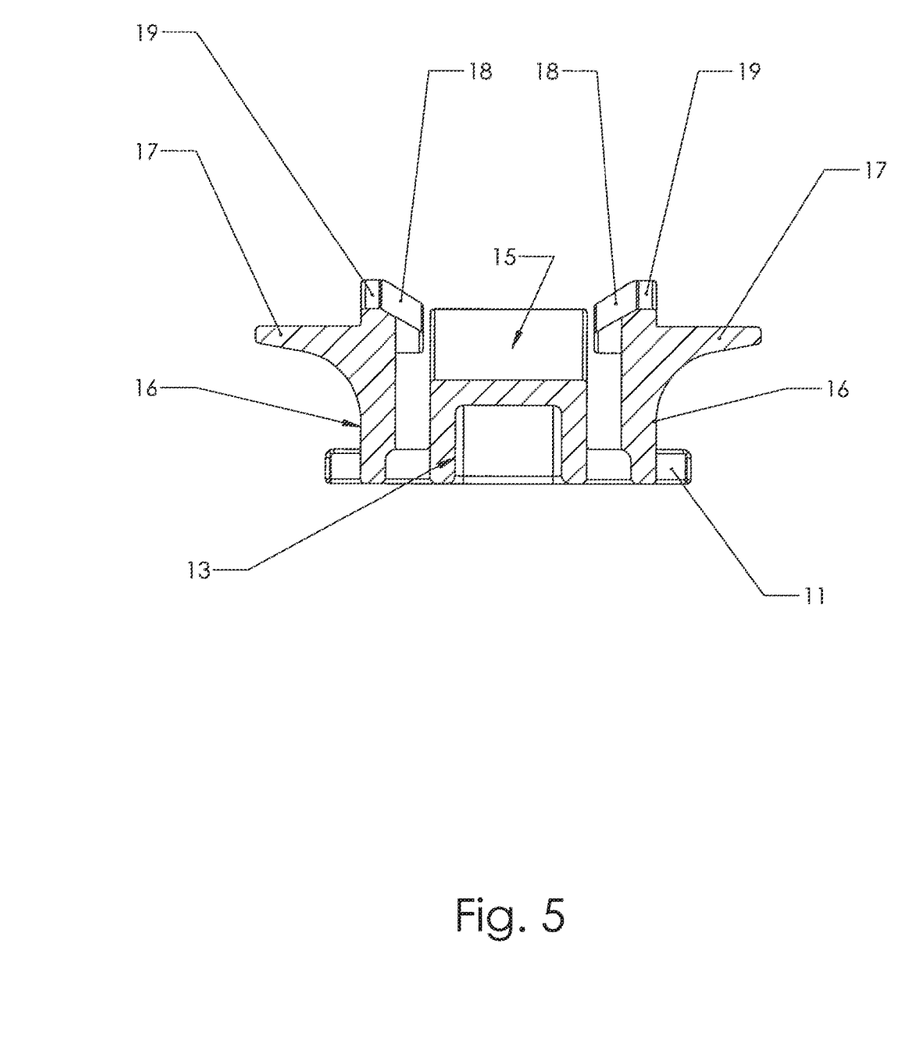
FIG. 5 illustrates a cross-sectional view of the clip of FIG. 1 taken on line 5-5 of FIG. 2.
Figure 6:
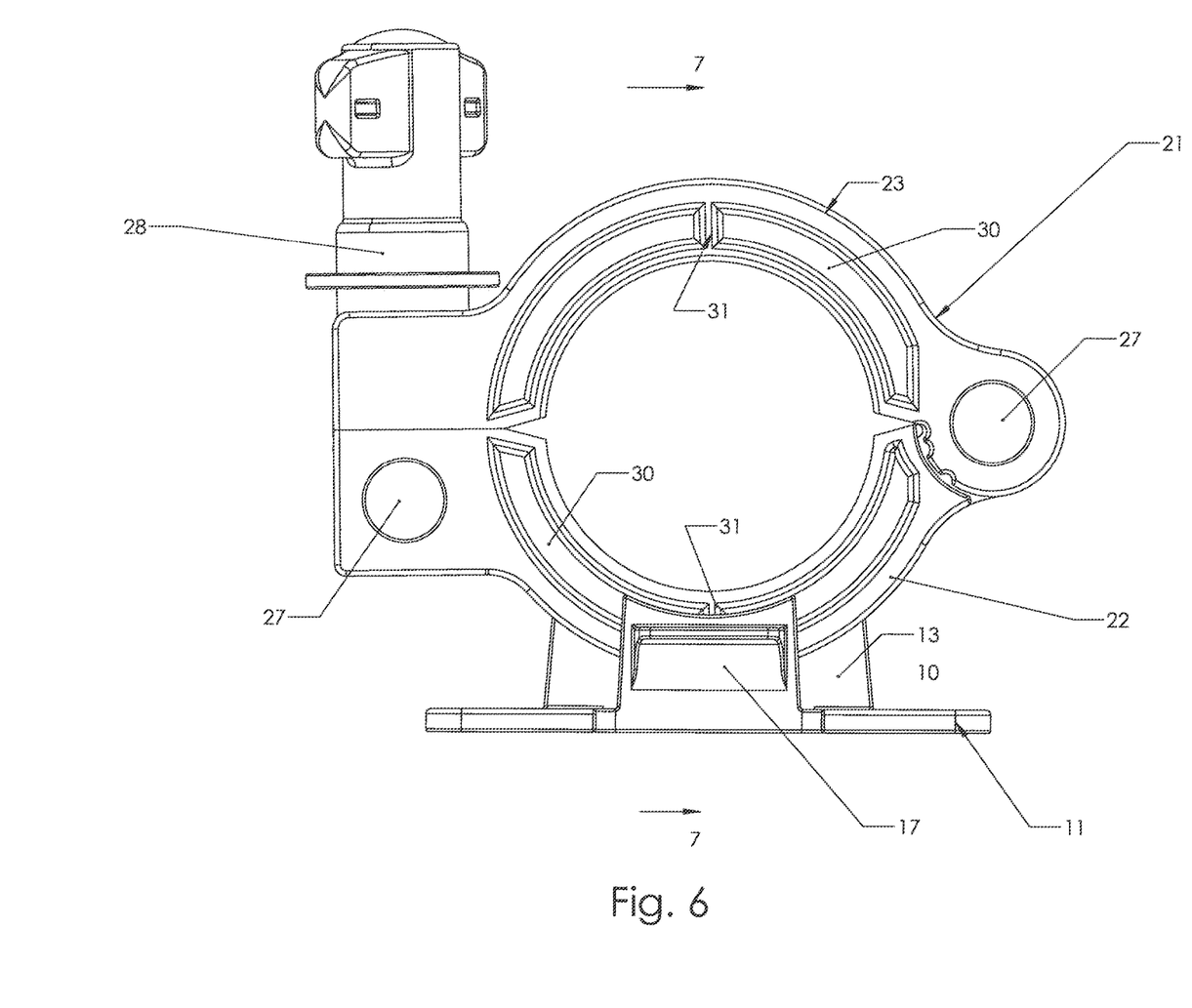
FIG. 6 illustrates a side view of the clip of FIG. 1 with a clamp mounted in place thereon.

As illustrated in FIGS. 1, 2 and 5, the mounting clip 10 has a pair of upstanding walls 16 disposed in parallel to the mounting block 13 and extending upwardly, as viewed, from the base 11. Each wall 16 has an outwardly extending tab 17 at an upper end which provides a surface for engagement, for example, by a thumb (not shown) of a person in order to apply a force on the wall 16 for flexing of the walls 16 away from each other. In this regard, the walls 16 are connected integrally with the base 11 in a skeletal manner as indicated in FIGS. 2 and 5.

Each wall 16 also has an inwardly extending lip 18 opposite the tab 17 for purposes as described below.

As illustrated in FIG. 1, each wall 16 has a curvilinear top surface 19 for purposes as described below and each lip 18 is of a corresponding curvilinear shape for purposes as described below. Each lip 18 is also provided with a gap 20 at an intermediate central point for purposes as described below.

Figure 8:
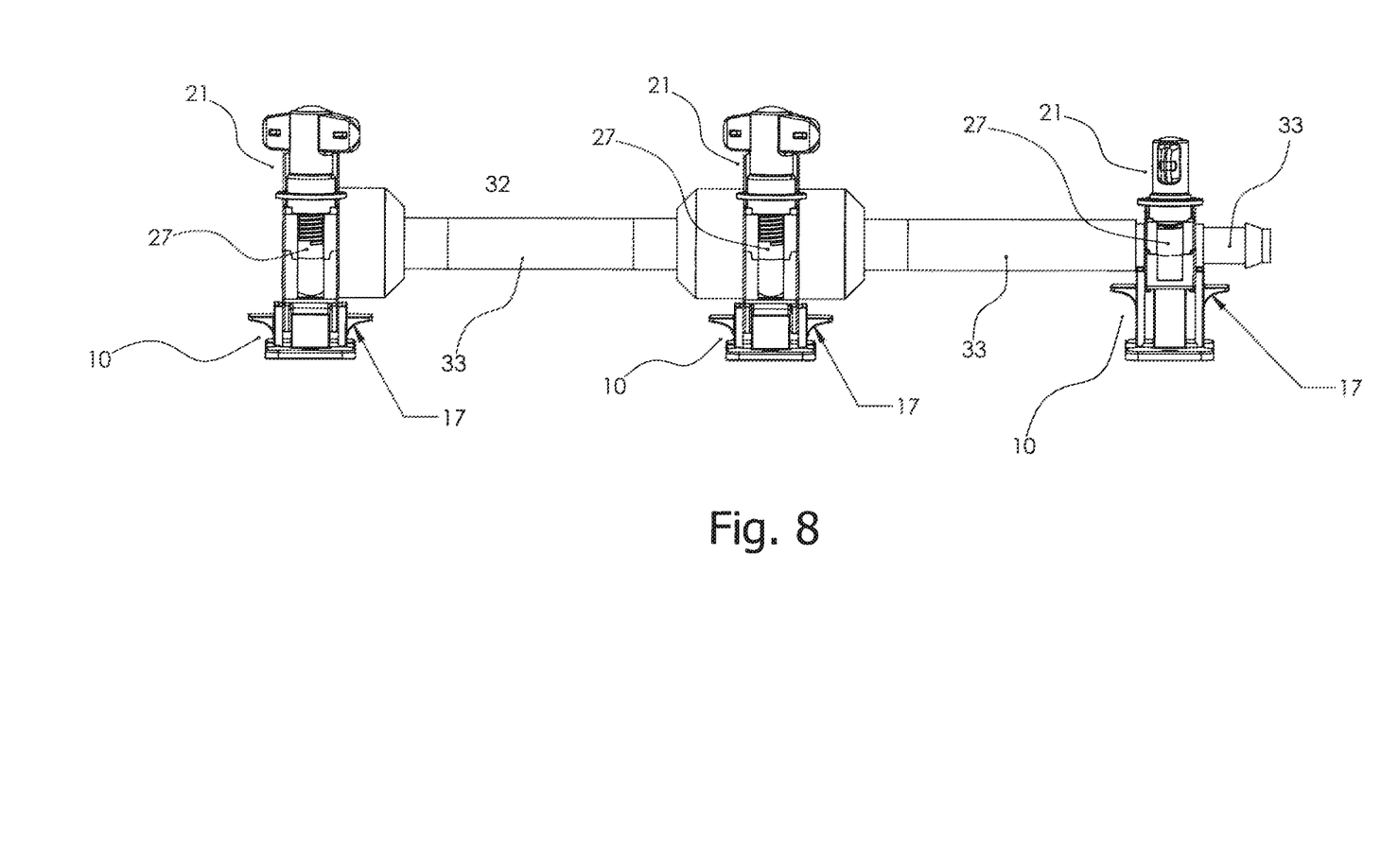
FIG. 8 illustrates a side view of a tubing flow path assembly employing the clips and clamps of the invention.

Referring to FIG. 8 wherein like reference characters indicate like parts as above, the mounting clip 10 is sized and shaped to seat a clamp 21 in place thereon.

As illustrated, the clamp 21 is made of plastic and includes a pair of arcuate jaws 22, 23 that are hinged together via a pivot pin 24 at one end in order to open and close relative to each other. Each jaw 22, 23 includes an arcuate groove 25 (see FIG. 7) on an inner periphery for purposes as described below.

A locking nut assembly 26 is provided to secure the jaws 22, 23 together when closed on each other. This locking nut assembly 26 is similar to the locking nut assembly described in U.S. patent application Ser. No. 14/155,306, filed Jan. 14, 2014 and has a threaded pin 27 (see FIG. 8) pivotally mounted on an end of the lower jaw 22 opposite the end with the pivot pin 24 and is releasably disposed in a bifurcation (not shown) of the upper jaw 23 when the jaws 22, 23 are closed on each other. The locking nut assembly 26 also has a nut 28 threaded on the threaded pin 27 that is to be seated within a recessed seat in the upper jaw 23

Figure 7:
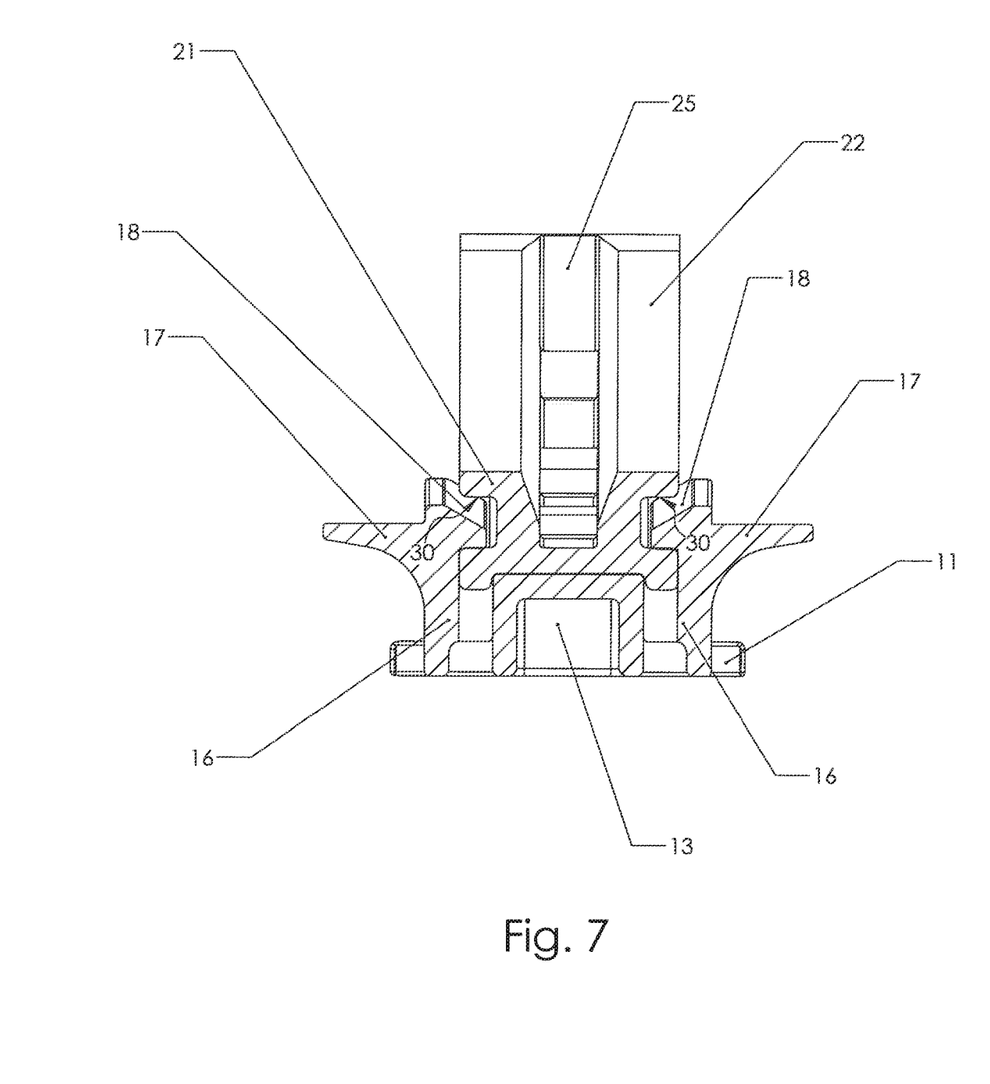
FIG. 7 illustrates a view taken on line 7-7 of FIG. 6.

Each jaw 22, 23 has a circular outer periphery flanked by a pair of upstanding flanges 29 as indicated in FIG. 7. In addition, each side of each jaw 22, 23 has an arcuate groove 30 interrupted by a wall 31 located at an intermediate central point of the respective groove 30.

Figure 9:
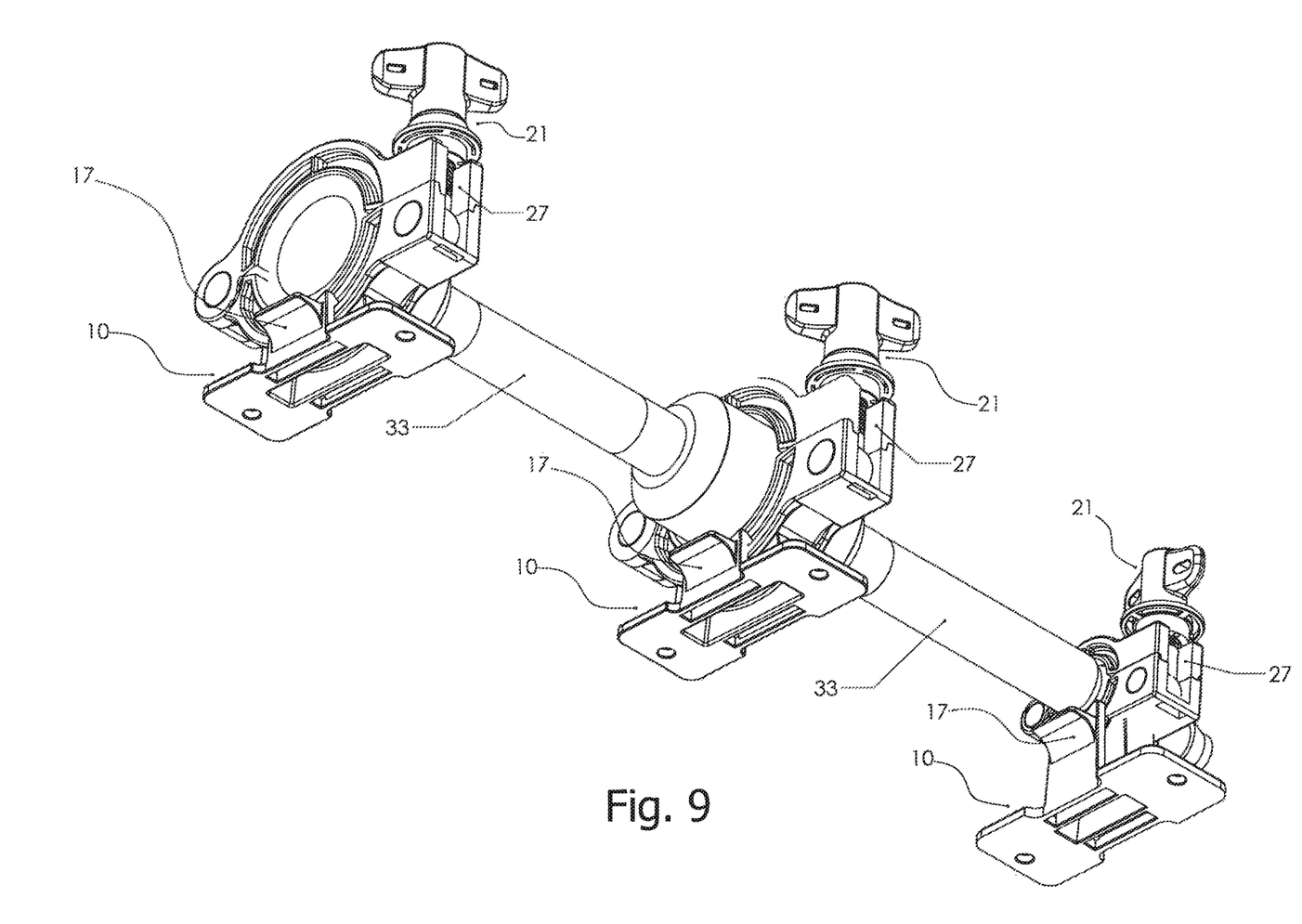
FIG. 9 illustrates a perspective view of the tubing flow path assembly of FIG. 8.

Referring to FIGS. 8 and 9 wherein like reference characters indicate like parts as above, a plurality of clamps 21 and mounting clips 10 are employed to mount a tubing flow path assembly 32 on a suitable flat support surface (not shown).

As indicated, the tubing flow path assembly 32 includes a plurality of tubular modular elements 33 that are connected via the clamps 21 and supported on the clips 10. These modular elements 33 may be of identical construction or of distinct construction. In either case, each modular element 33 includes an upstanding circular collar 34 (see FIG. 7) at one or both ends with a tubular central section, for example, for conveying a liquid for the preparation of a pharmaceutical.

In order to assemble the tubing flow path assembly 32, a pair of modular elements 33 are butted together and an opened clamp 21 is fitted about the butted collars 34 such that the collars 34 fit into the arcuate grooves 25 on the inner periphery of the jaws 22, 23 (see FIG. 7).

The jaws 22, 23 of the clamp 21 are then closed on each other and the locking nut assembly 26 is moved into a locking position.

In order to mount a clamp 21 on a mounting clip 10, the clip 10 is secured in place on the flat support surface. Next, a clamp 21 is snap-fitted into the clip 10. In this regard, the walls 31 of the clamp 21 are aligned with the gaps 20 in the lips 18 of the clip 10 and the clamp 21 is pressed against the lips 18 and into the clip 10.

During this time, the lips 18 of the clip 10 spread apart and the walls 16 on which the lips 18 are disposed flex outwardly of each other allowing the lips 18 to snap into the arcuate grooves 30 on the sides of the clamp 21. At the same time, the circular outer periphery of the lower jaw 22 of the clamp 21 seats on the an arcuate seating surface 16 of the mounting block 14 of the clip 11 with each upstanding flange 29 of the lower jaw 22 disposed between the mounting block 14 and a wall 16. (See FIG. 7)

The sequence of assembling the tubing flow path assembly 32 may vary. For example, the clamps 21 may be fitted into a plurality of mounting clips 10 that are located at fixed points before the modular elements 33 are mounted in the clamps 21. In order to dis-assemble a clamp 21 from a mounting clip 10, the tabs 17 of the clip 1 are pressed downwardly, for example, by a thumb (not shown) of a person in order to apply a force on the walls 16 for flexing of the walls 16 away from each other thereby releasing the clamp 21 from engagement in the clip 10. The clamp 21 may then be removed from the clip 10 manually.

Referring to FIG. 1, the mounting block 14 extends longitudinally outwardly of the walls 16 and may be sized to be of greater or less height relative to the base 11 in dependence on the size of the clamp 21 that is to be mounted thereon.

Of note, the walls 31 of the clamp 21 that are aligned with the gaps 20 in the lips 18 of the clip 10 facilitate orientation of the clamp 21 such that the locking nut assembly 26 is disposed with the threaded pin 27 in a vertical plane when in the locking position (as indicated in FIGS. 8 and 9) and, thus, for ease of access to a user.

Figure 10:
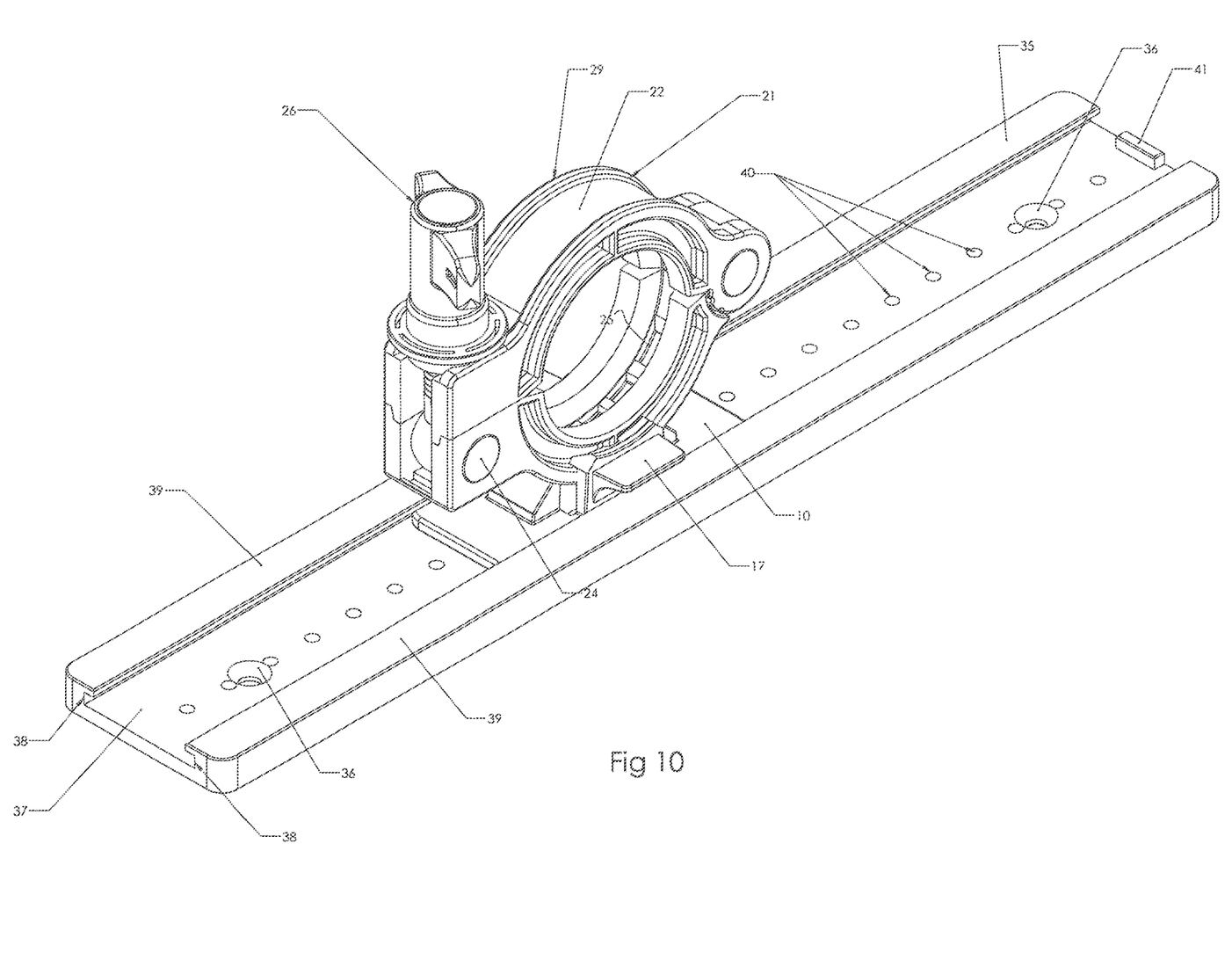
FIG. 10 illustrates a perspective view of a mounting clip and clamp in a track in accordance with the invention.

Referring to FIG. 10, wherein like references indicate like parts as above, the tube management assembly may employ a track 35 that can be mounted on a vertical surface, a horizontal surface or an inclined surface. To this end, his track 35 has one or more apertures 36 for receiving screws or other securing elements (not shown).

The track 35 also has a flat base 37, a pair of parallel walls 38 that extend from the base 37 and a pair of flanges 39, each of which extends from one wall 38 toward the other wall to define a trackway in order to slidably receive the mounting clip 10. As illustrated, the trackway is in the form of an inverted T-shaped slotted trackway in order to retain the mounting clip 10 therein. In this case, the base 11 of the mounting clip 10 is free of the apertures 12 of FIG. 1.

The base 11 of the mounting clip 10 is also provided with projections (not shown) on the bottom for fitting into positioning holes 40 disposed in alignment longitudinally of the base 37 of the track 35. Preferably, the track 35 and mounting clip 10 are made of plastic so that the clip 10 can be readily moved manually along the length of the track 35 to a proper position (and held by the mating of the projections and positioning holes 40) for positioning the clamp 21 holding the tubular modular elements 33 (see FIG. 8).

The track 35 may also have a stop 41 at one end of the base 37 to prevent the clip 10 from sliding out of the track 35 at that end.

Figure 11:
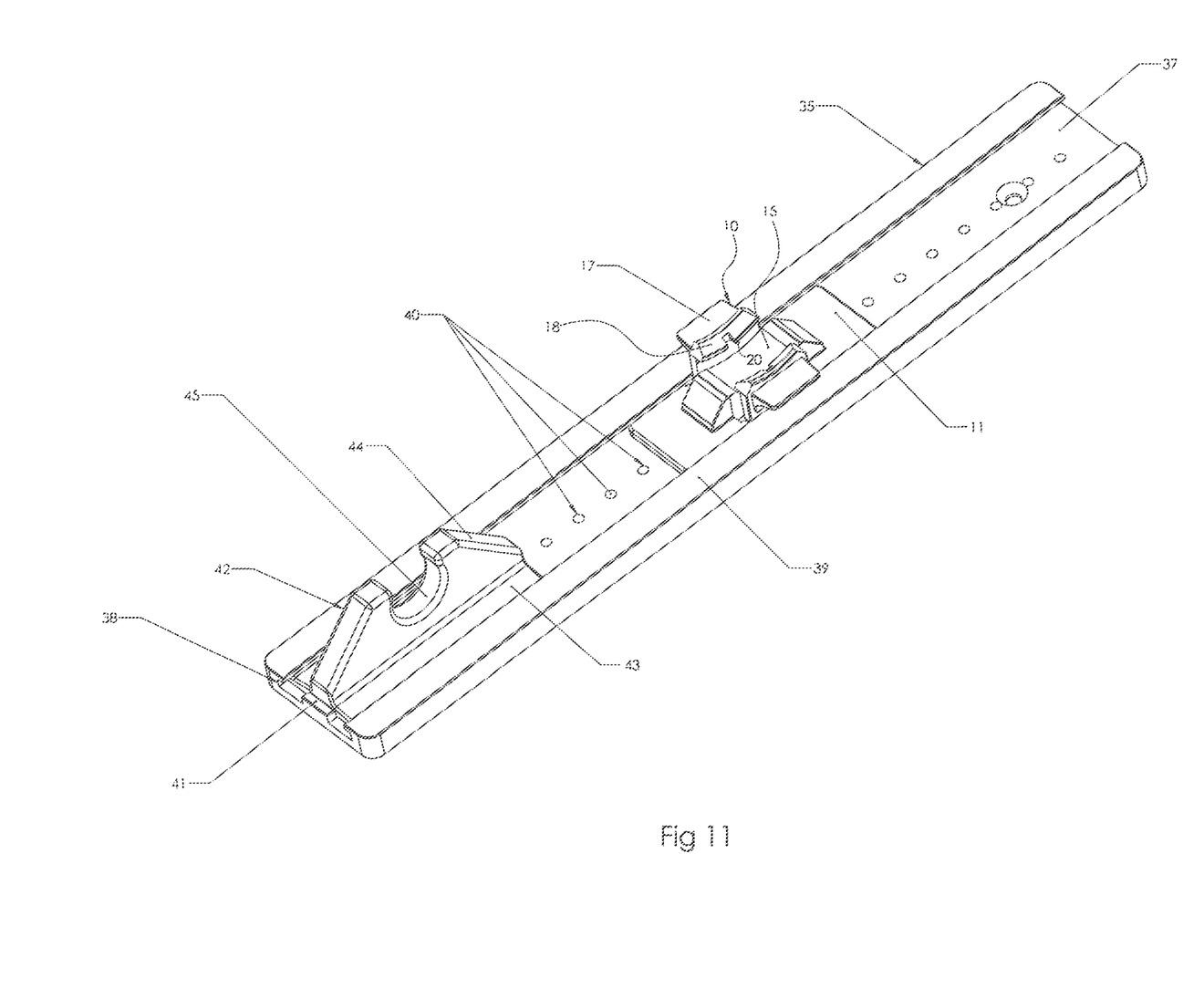
FIG. 11 illustrates a perspective view of a track with a mounting clip for receiving a clamp and a mounting clip for receiving a tube in accordance with the invention.

Referring to FIG. 11, wherein like references indicate like parts as above, the track 35 may be used to mount different mounting clips 10, 42.

In one case, the mounting clip 10 is constructed as above described.

Figure 13:
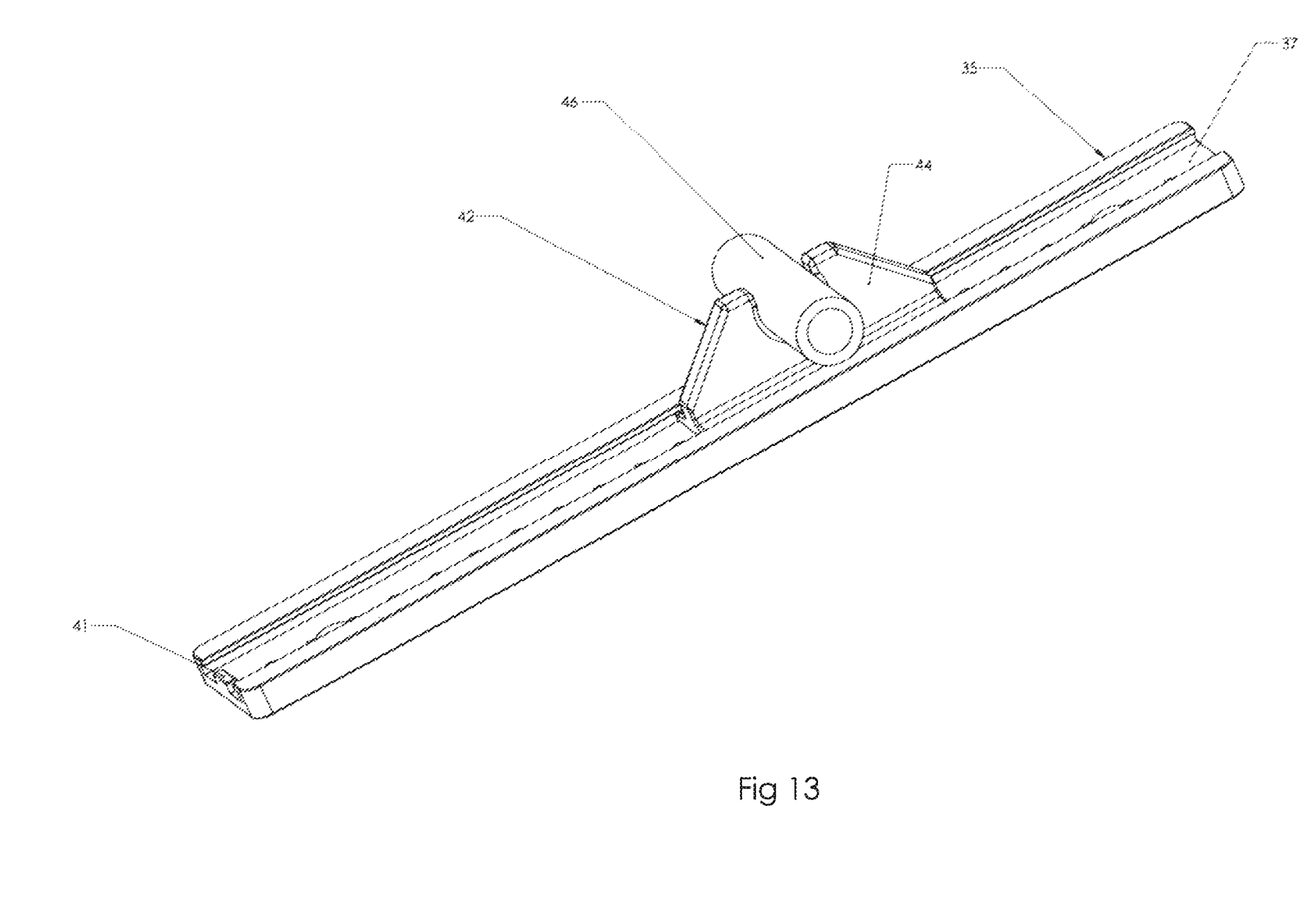
FIG. 13 illustrates a perspective view of a track with a mounting clip receiving a tube in accordance with the invention.

In the other case, the mounting clip 42 has a flat base 43 slidably mounted in the trackway of the track 35 and a mounting block 44 extending from the base 43 and including a recess 45 for receiving a tube 46 (see FIG. 13) transversely of the track 35. As indicated, the recess 45 is U-shaped to receive a tube and may have small inwardly directed projections (not shown) on opposite sides to retain the tube in place.

In each case, the mounting clip 10, 42 is provided with projections (not shown) on the bottom for fitting into the positioning holes 40 disposed in the track 35.

Figure 12:
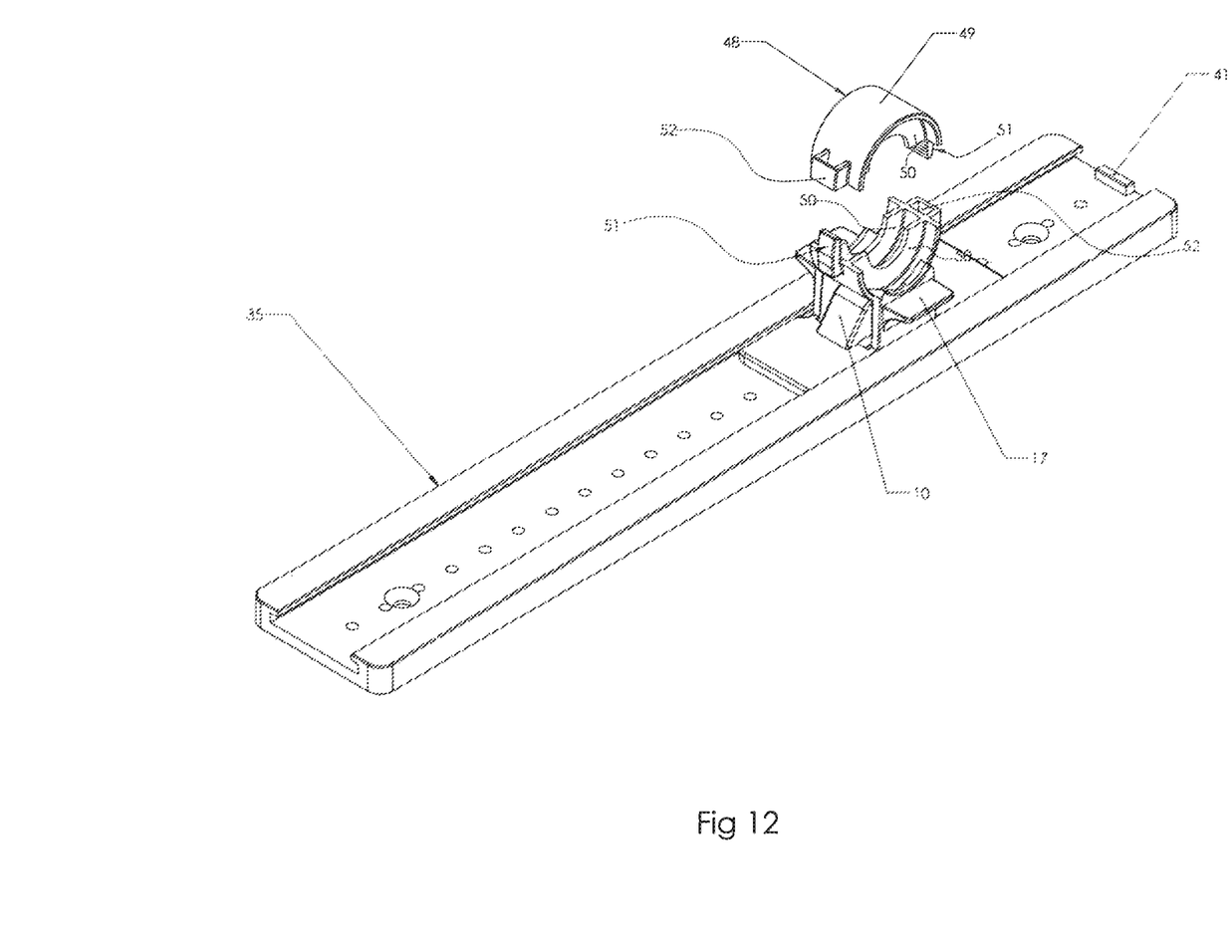
FIG. 12 illustrates a perspective view of a track with a mounting clip and a modified clamp in accordance with the invention.

Referring to FIG. 12, wherein like references indicate like parts as above, the tube management assembly may employ a clamp 47 formed of a pair of semi-circular jaws 48 that can be snap-fitted together to receive a tube.

As illustrated, the jaws 48 are of similar construction. Each jaw 48 includes a semi-circular base 49 and a pair of parallel walls 50 that extend internally from the base 49 and inside of the edges of the base 49 to form a recess to receive the lip 18 of the mounting clip 10.

The base 49 of the lower jaw 48, as viewed, is sized to seat on the seating surface 15 (not shown) of the mounting clip 10

Each jaw 48 has a rectangular shaped tab 51 projecting from one end and a sleeve-like member 52 sized to receive the tab 51 of the other jaw 48.

When fitted together, the jaws 48 firmly secure a tube (not shown) in place.

The invention thus provides a temporary tube management assembly for organizing and effectively managing the tubing and fluid paths that are created in a drug production work area.

The invention mechanically secures single use fittings and tubing in place for single use systems to manufacture liquid drug products. In particular, the invention provides a mounting clip that provides a secure locking arrangement for a clamp as well as a tube management assembly that can be easily assembled to control a fluid path in a drug production area and dis-assembled after use.

What is claimed is:

1. A combination of
   a mounting clip having a mounting block thereon, a pair of walls extending in parallel on opposite sides of said mounting block and pair of lips, each said lip extending from a respective wall of said pair of walls towards the other of said pair of walls; and
   a clamp releasably mounted in said mounting clip, said clamp having a pair of arcuate jaws, at least one of said jaws being seated on said mounting block and having an arcuate groove on each side thereof receiving a respective lip of said mounting clip.

2. The combination as set forth in claim 1 wherein said mounting block has an arcuate seating surface receiving said clamp thereon.

3. The combination as set forth in claim 1 wherein at least one of said jaws has a pair of flanges in an outer periphery receiving said mounting block therebetween.

4. The combination as set forth in claim 1 wherein said mounting clip has a pair of tabs, each said tab extending outwardly of a respective wall of said pair of walls for manual engagement thereof to resiliently flex said respective wall away from the other of said pair of walls.

5. The combination as set forth in claim 1 wherein said mounting clip is made of plastic and said clamp is made of plastic.

6. The combination as set forth in claim 1 wherein each said lip of said mounting clip has a gap at a central point thereof and said at least one jaw of said clamp has a wall in each said groove thereof disposed in said gap of each said lip.

7. The combination as set forth in claim 1 wherein said jaws are disposed in hinged relation to each other for opening and closing relative to each other.

8. The combination as set forth in claim 1 wherein each of said jaws has a semi-circular base, a pair of parallel walls extending internally from said base and inside of edges of said base to form a recess to receive said lip of said mounting clip, a tab projecting from one end of said base and a sleeve-like member at an opposite end of said base to receive said tab of the other jaw.

9. A combination of
   a plastic mounting clip having a mounting block thereon, a pair of resiliently flexible walls extending in parallel on opposite sides of said mounting block, each said wall having a lip extending inwardly towards the other of said pair of walls and a tab extending outwardly away from said lip for manual engagement thereof to resiliently flex said respective wall away from the other of said pair of walls; and
   a clamp releasably mounted in said mounting clip, said clamp having a pair of arcuate jaws, at least one of said jaws being seated on said mounting block between said walls and having an arcuate groove on each side thereof receiving a respective lip of said mounting clip.

10. The combination as set forth in claim 9 wherein each said lip of said mounting clip has a gap at a central point thereof and said at least one jaw of said clamp has a wall in each said groove thereof disposed in said gap of each said lip.

11. The combination as set forth in claim 10 wherein said clamp has a locking nut assembly securing said jaws together and disposed in a vertical plane with said clamp in said mounting clip.

12. A tube management assembly comprising
    a track having a flat base, a pair of parallel walls extending from said base and a pair of flanges, each said flange extending from one of said walls toward the other of said walls to define a trackway;
    at least one mounting clip having a flat base slidably mounted in said trackway of said track, a mounting block on said base, a pair of resiliently flexible walls extending in parallel on opposite sides of said mounting block from said base and pair of lips, each said lip extending from a respective wall of said pair of walls towards the other of said pair of walls; and
    a clamp releasably mounted in said mounting clip, said clamp having a pair of arcuate jaws, at least one of said jaws being seated on said mounting block and having an arcuate groove on each side thereof receiving a respective lip of said mounting clip.

13. A tube management assembly as set forth in claim 12 wherein said mounting block has an arcuate seating surface receiving said clamp thereon and at least one of said jaws has a pair of flanges in an outer periphery receiving said mounting block therebetween.

14. A tube management assembly as set forth in claim 12 wherein said mounting clip has a pair of tabs, each said tab extending outwardly of a respective wall of said pair of walls for manual engagement thereof to resiliently flex said respective wall away from the other of said pair of walls.

15. A tube management assembly as set forth in claim 14 wherein said mounting clip is made of plastic and said clamp is made of plastic.

16. A tube management assembly as set forth in claim 12 wherein each said lip of said mounting clip has a gap at a central point thereof and said at least one jaw of said clamp has a wall in each said groove thereof disposed in said gap of each said lip.

17. A tube management assembly as set forth in claim 12 further comprising at least one mounting clip having a flat base slidably mounted in said trackway of said track and a mounting block extending from said base and including a recess for receiving a tube therein transversely of said track.

\* \* \* \* \*